United States Patent [19]

Doust

[11] 4,051,690
[45] Oct. 4, 1977

[54] METHOD AND APPARATUS FOR FREEZING FISH

[76] Inventor: David John Doust, 276 St. James Street West, Suite 417, Montreal, Quebec, Canada, H2Y 1N3

[21] Appl. No.: 597,587

[22] Filed: July 21, 1975

[30] Foreign Application Priority Data

July 22, 1974 United Kingdom ............... 32366/74

[51] Int. Cl.² ............................................. F25D 17/02
[52] U.S. Cl. ............................................. 62/64; 43/8; 62/60; 62/240; 62/375; 62/433; 62/436; 114/255
[58] Field of Search .............. 43/8; 114/.5 A; 62/431, 62/433, 436, 240, 373, 374, 375, 376, 64, 60

[56] References Cited

U.S. PATENT DOCUMENTS

| | | | |
|---|---|---|---|
| 1,547,258 | 7/1925 | Newton | 62/376 X |
| 1,710,386 | 4/1929 | Taylor | 62/60 X |
| 1,791,023 | 2/1931 | Dahl et al. | 62/375 X |
| 1,827,856 | 10/1931 | Pope | 62/433 |
| 2,377,693 | 6/1945 | Johnston | 114/.5 |
| 2,413,918 | 1/1947 | Harris | 114/.5 |
| 2,746,272 | 5/1956 | Carpenter | 62/240 X |
| 3,261,176 | 7/1966 | Puretic | 62/240 |
| 3,802,214 | 4/1974 | Prieto | 62/240 |

Primary Examiner—Ronald C. Capossela
Attorney, Agent, or Firm—Larson, Taylor and Hinds

[57] ABSTRACT

A continuous output brine freezing system is disclosed particularly applicable to the freezing of large fish such as tuna on board fishing vessels. The vessels include a series of fish freezing tanks within which the large fish, after being encapsulated in plastic bags and vacuum sealed, are loaded and frozen in sequence. One of said tanks is a brine storage tank and has means of precooling the brine to a temperature of $-35°$ C. Means are provided for feeding the precooled brine from the first tank to the next tank in line and to the remaining tanks in sequence as the tanks are loaded with fish. Means are also provided to remove the brine from the tanks in sequence and to return the brine to the first tank as the fish are frozen. Means are provided to maintain the quality of the brine and to recycle the brine through the system as fish are brought on board and loaded into the tanks, and to unload the frozen fish from the tanks by flotation with brine.

10 Claims, 8 Drawing Figures

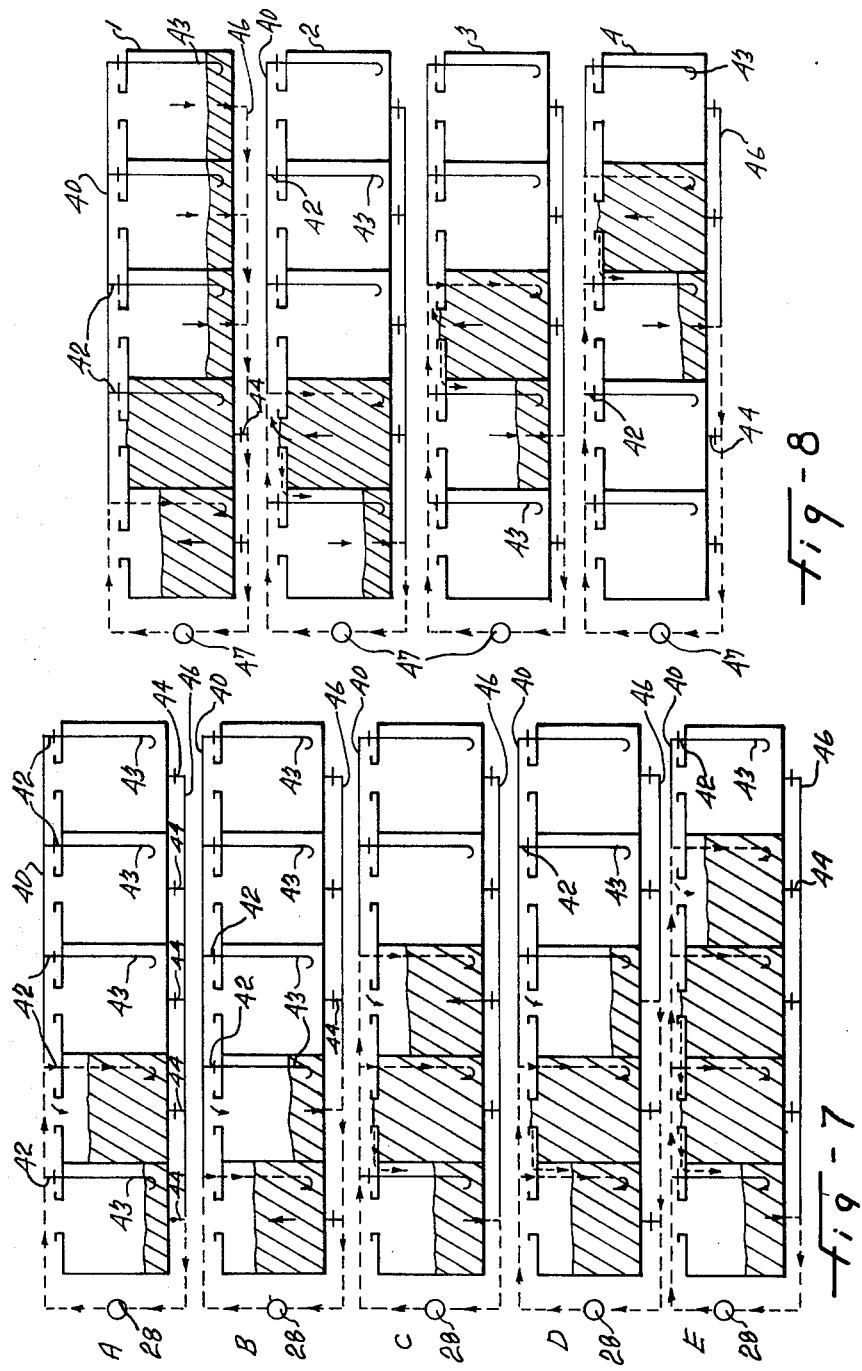

METHOD AND APPARATUS FOR FREEZING FISH

This invention relates to a continuous output brine freezing system particularly applied to the freezing of large fish, such as tuna, on board fishing vessels.

According to the present invention, there is provided on board a tuna fishing vessel, a series of fish freezing tanks, preferably in two rows, one on the port side and one on the starboard side. Each of the freezing tanks are provided with a hatch coaming at the main deck level and a hatch cover hermetically seals the freezing tanks while the process of freezing the fish is carried out and until the frozen fish are unloaded at a shore base.

Preferably two separate refrigerating plants are provided, one for each separate row of freezing tanks, each refrigerating plant comprising a sea water pump, cooling condenser, a brine chiller and a brine supply pump. The brine supply pumps feed the chilled brine into a common brine supply header from which the brine is fed to the separate freezing tanks through suitable control valves which can be operated from a central position on the deck of the vessel.

Preferably also the brine is unloaded from the freezing tanks by the use of a brine unloading pump and into a common header.

Excess brine supply from its common header and the unloaded brine are fed into brine collecting tanks, where sea water or fresh water is added and the brine is filtered before being recycled through the system.

When the vessel leaves harbour, one of the freezing tanks in each row is filled with brine, of a volume necessary to process the whole load of tuna to be contained in one row of tanks. While the vessel is proceeding to the fishing grounds, the brine contained in this one well is pre-cooled to a temperature of $-35°$ C., in order that the brine will be ready for use in freezing the fish when the fishing operation begins.

As the caught fish are brought on board, they are individually placed in plastic bags which are then vacuum sealed. The bagged fish are then conveyed to and lowered into one of the freezing tanks.

In order to overcome the problem of buoyancy of the fish (the specific gravity of the brine being approximately 1.2 against that of 0.98 per tuna) each freezing tank to be loaded is filled with brine to about 80% of its capacity, in order to minimize bruising of the fish as it is lowered into the brine.

As the fish are loaded into the tank, the brine level is lowered progressively so that the tanks can be filled to their top, without compressing the fish underneath. When filled, each tank is hermetically sealed and the brine circuit to the tank is opened and the brine is circulated in the tank from the bottom up to the top. An overflow device regulates the brine circulation according to the temperature.

The loading of the fish into each of the freezing tanks of the port and starboard rows is progressive from one end of each row to the other end, and at the same time the feed of brine to each tank proceeds as each tank is loaded, this operation being controlled from a central location above deck.

The frozen fish are retained in the tanks until the vessel reaches port.

When unloading of the frozen fish takes place, the increased density of the brine (Calcium Chloride) ensures that each individual bagged fish is ejected from the tanks by flotation action onto a conveyor servicing each row of tanks, and then onto a transverse conveyor which carries the fish up to a wharf.

As the first tank in each row is emptied of fish and is filled with brine, this brine is used to flood the next in line tank, and so on until the last tank in the row is emptied of fish. The brine in the last tank of the row is then pumped back into the first tank in the row, ready for use in freezing fish during further fishing operations.

Embodiments of the invention will now be described, by way of example, with reference to the accompanying drawings in which:

FIG. 7 is a schematic diagram of one row of freezing tanks illustrating the flow of brine to the tanks coincident with the loading of tuna into the tanks.

FIG. 8 is a schematic diagram similar to FIG. 6, but illustrating the flow of brine from the tanks coincident with unloading of the tuna from the tanks.

Figure 1:
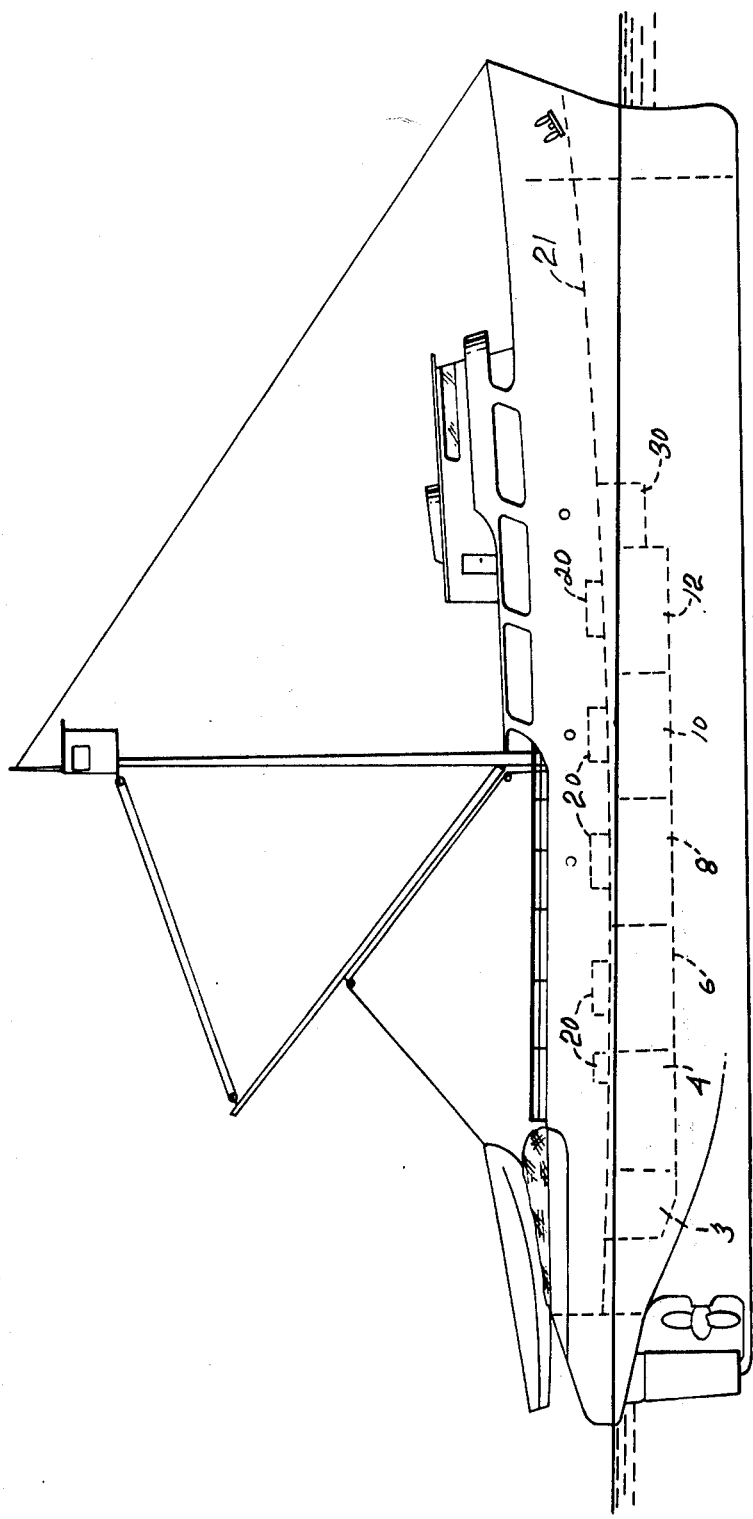
FIG. 1 is a profile of a refrigerated tuna seiner according to the present invention, showing in dotted lines the location of the tuna freezing tanks.

Referring to the drawings, the fishing vessel shown in FIG. 1 is a tuna seiner in which the tuna brought on board are individually bagged and vacuum sealed and are then conveyed along the main deck to be lowered into selected freezing tanks, where the tuna are frozen and kept frozen until unloaded at a shore base.

Figure 2:
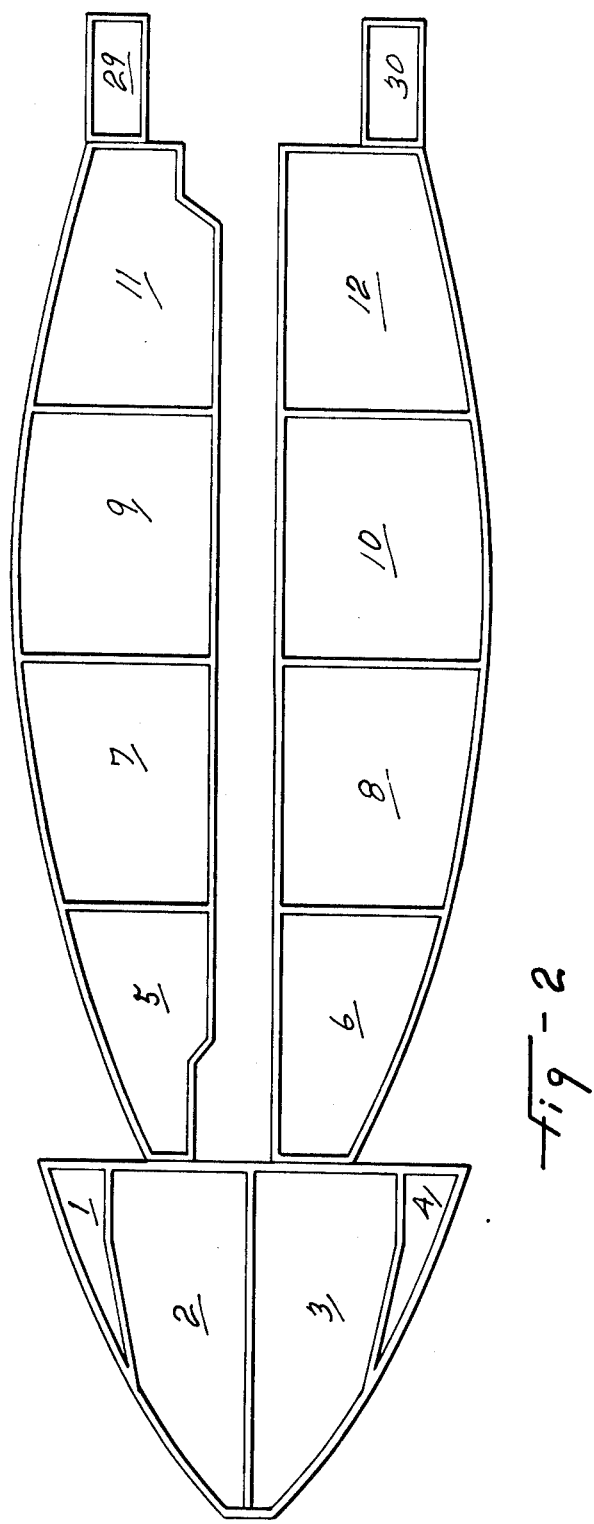
FIG. 2 is a plan sectional view of the arrangement of the fish freezing tanks and brine collecting tanks.
Figure 3:
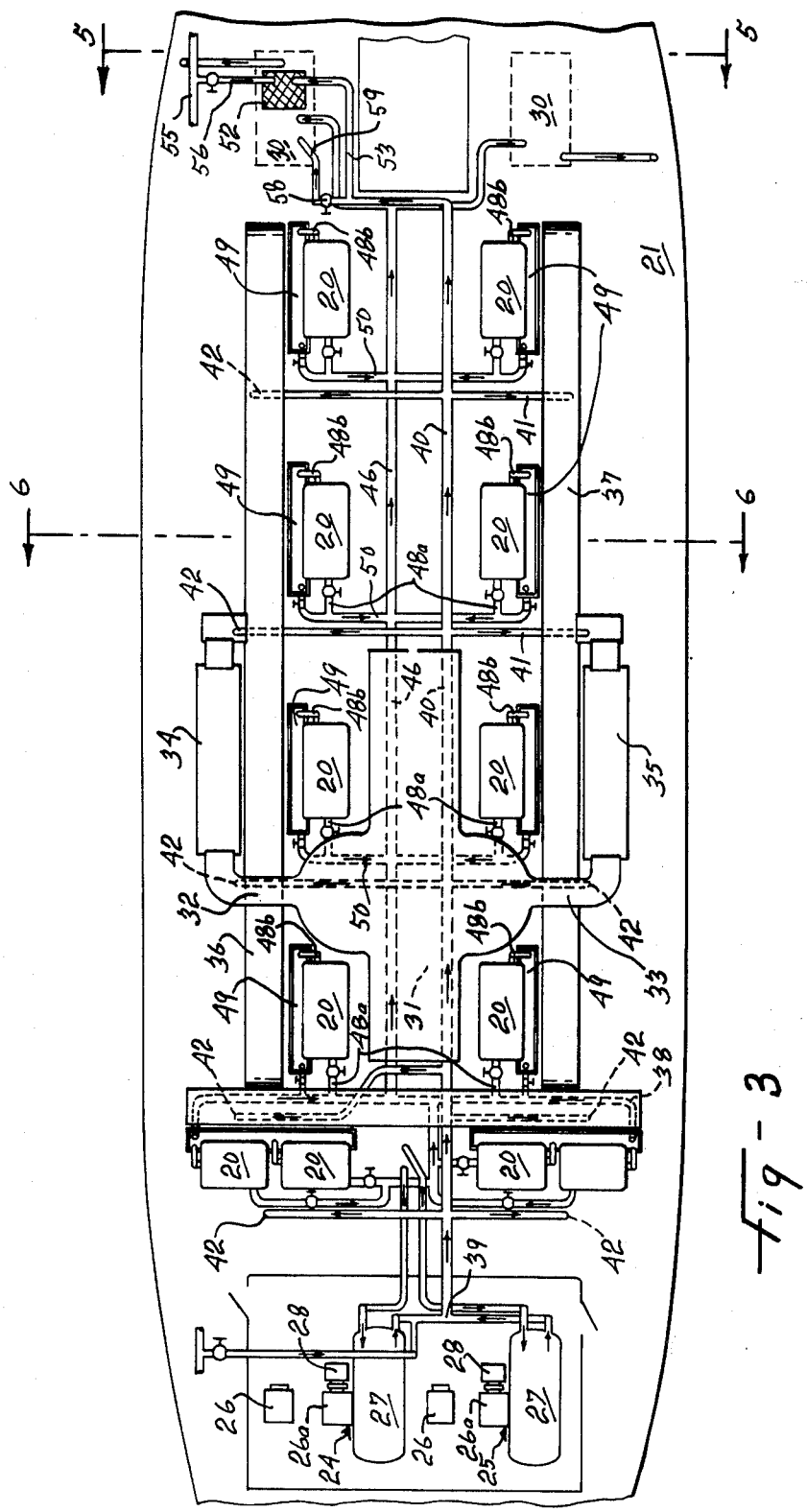
FIG. 3 is a partial plan view of the main deck level of the vessel shown in FIG. 1, showing the refrigeration machinery and the piping arrangement between the refrigeration machinery and the freezing tanks.
Figure 4:
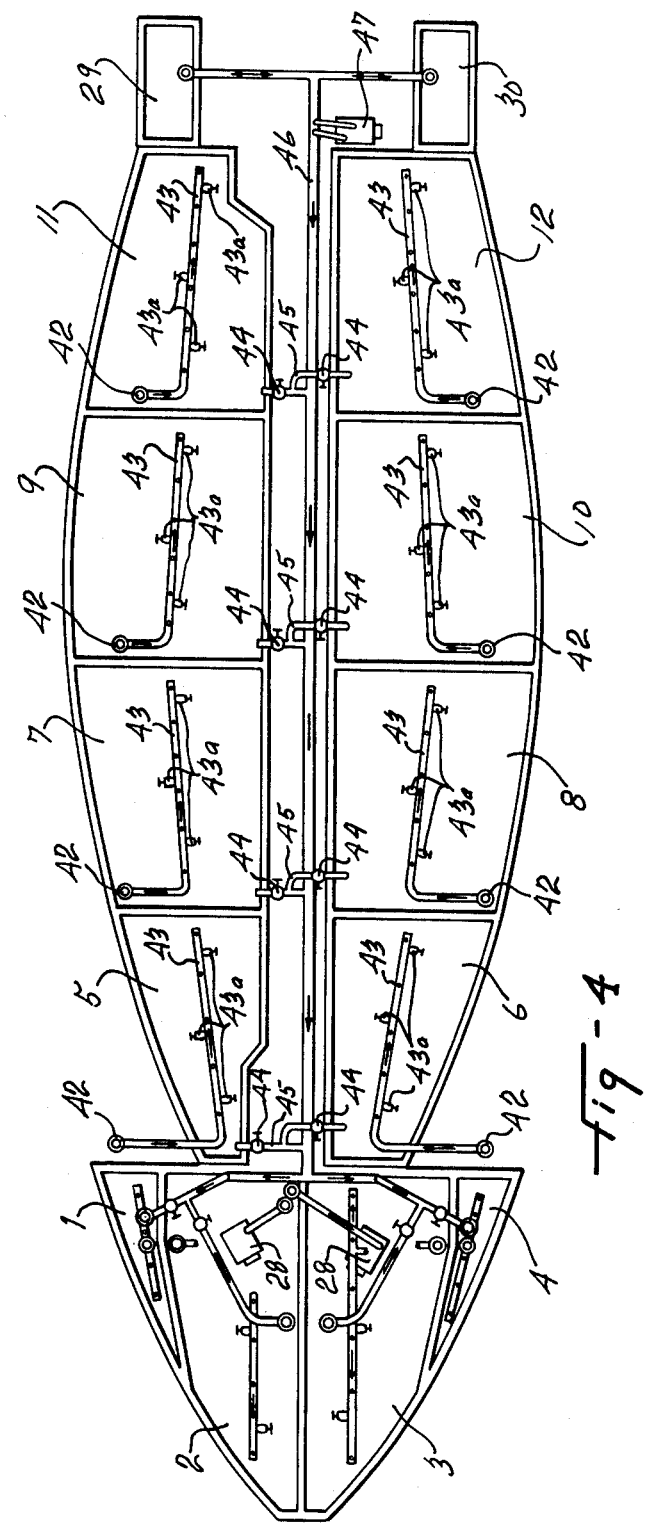
FIG. 4 is a partial plan view similar to FIG. 3, but showing the brine feed pipes within the freezing tanks and the tank drain pipe arrangement.
Figure 5:
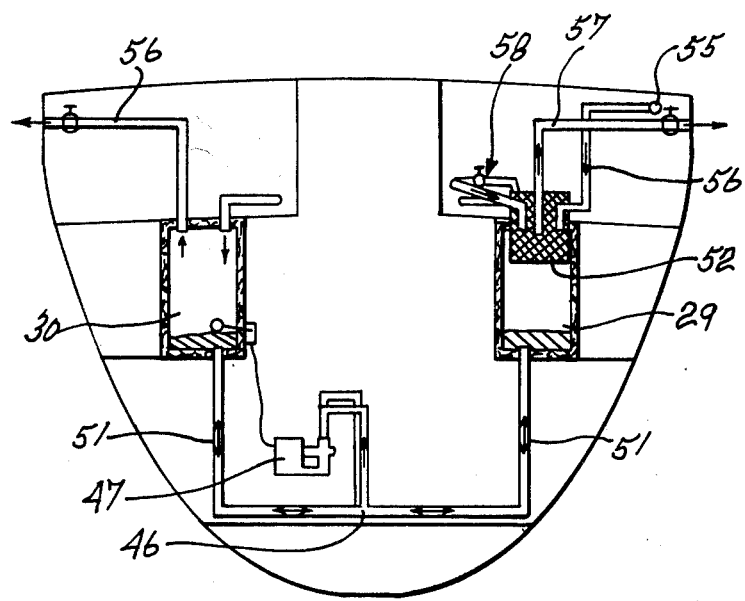
FIG. 5 is a transverse section of the vessel, taken on the line A—A of FIG. 3.
Figure 6:
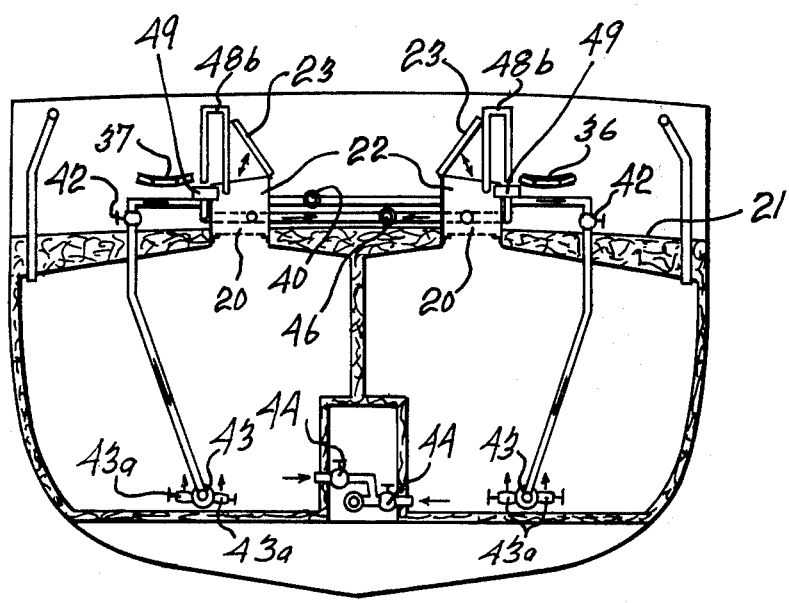
FIG. 6 is a transverse section of the vessel, taken on the line B—B of FIG. 3.

In FIGS. 2, 3 and 4, the freezing tanks are numbered 1 to 12 inclusive and are arranged in two rows longitudinally of the vessel, one row on the port side and one row on the starboard side.

Referring now particularly to FIGS. 2, 3, 4, 5 and 6, the port side row of freezing tanks are numbered 1, 2, 5, 7, 9 and 11, while the starboard side row of freezing tanks are numbered 3, 4, 6, 8, 10 and 12.

Each of the freezing tanks has a hatch opening 20 at the level of the main deck 21, the openings being surrounded by a coaming 22 and closed by a hatch cover 23 which can be hermetically sealed during the fish freezing operation and kept sealed until the fish are unloaded at a shore base. Preferably the hatch opening is protected by a grating 20a.

Separate port and starboard refrigerating apparatus 24 and 26 located aft are provided for servicing the port and starboard brine collecting tanks 29 and 30.

A fish pound 31 has constricted port and starboard areas 32 and 33, each of which has openings through which the fish are individually delivered to fish handling machinery areas 34 and 35 where the fish are placed in plastic bags and the bags are vacuum sealed. The bagged fish are then placed on the port and starboard conveyors 36 and 37 for delivery to selected hatches and lowering into the freezing tanks below.

The conveyors 36 and 37 are reversible and are used to convey the frozen fish, unloaded from the tanks, onto a transverse conveyor 38 for delivery from the vessel onto a wharf at a shore base.

Each of the freezing tanks is served with brine from the brine chillers 27 through a Y branch connection 59 connecting with a common supply header 40. Brine from the supply header 40 is fed through the connecting pipes 41 and control valves 42 to the perforated pipes 43 located in the bottom of each of the freezing tanks, each provided with one or more relief valves 43a. The valves 42 are controlled from a central location above the main deck 21.

Each of the freezing tanks is drained of brine through the valves 44 and pipe connections 45 leading to the common drain header 46, and a pump 47 pumps the drained brine from the header 46 into the port and starboard brine collecting tanks 29 and 30.

In normal operation of the freezing system, brine enters each closed freezing tank through the perforated pipes 43 and leaves via the overflow 48a, passing into the drain lines 50 and back to the common drain header 46.

Each of the freezing tanks is also provided with a brine overflow 48b which discharges into a collector pan 49, which in turn drains into the common drain header 46 through the pipe connection 50. This overflow system is used only for discharging fish from the freezing tanks when in port, with the fish hatches 23 in the open position.

The pump 47 is also used to pump brine via the header 46 from the bottom of collecting tanks 29 and 30 through the pipe connections 51.

The port brine collecting tank 29 serves as a mixing tank and is provided with a hatch opening into which is fitted a mixing basket 52. Brine from the supply header 40 is directed through the pipe 53 and valve 54 into the top portion of the mixing basket 52. Sea water is also directed from the fire main 55 and pipe connection 56 into the top portion of the mixing basket 52, and overflow from the mixing basket is directed overboard through the vent pipe 57. A relief valve 58 and pipe connection 59 also permit brine to bypass valve 54, in the event of blockage, and pass into the collecting tank 29.

In the operation of this invention, the individual fish are taken from the fish pound 31 and delivered to the fish handling machinery areas 34 or 35 where they are placed in plastic bags and vacuum sealed. The fish are then put on the conveyors 36 and 37 and directed to the hatch opening of the freezing tank into which they are to be lowered.

The sequence of loading the fish into the freezing tanks is illustrated diagrammatically in FIG. 7 in which five tanks are shown and the sequence of loading is indicated through the stages A, B, C, D and E. This sequence shown in FIG. 7 applies to both the port and starboard row of freezing tanks shown in FIGS. 2, 3 and 4.

The tank loading schedule as illustrated in FIG. 7 is as follows:

Tank No. 1 to be considered as the storage tank.

STAGE A: Transfer brine from tank No. 1 to tank No. 2 before loading tuna into tank No. 2. The brine flow between tank No. 1 to tank No. 2 is indicated by the dotted line.

STAGE B: Tank No. 2 in fish loading stage, brine level manually controlled by transfer from tank No. 1.

STAGE C: Tank No. 2 is freezing stage, bottom valve 44 closed. Temperature controlled by automatic top valve 42. Tank No. 3 in fish loading stage.

STAGE D: Tank No. 2 in holding (fish frozen) stage, temperature controlled by automatic top valve 42. Tank No. 3 in fish loading stage, brine level manually controlled by transfer in tank No. 1.

STAGE E: Tank No. 2 in holding (fish frozen) stage. Tank No. 3 in freezing stage. Tank No. 4 in brine filling and fish loading stage.

The sequence is continued until all tanks, including tank No. 1 are fully loaded and fish are frozen, with the bottom valves 44 closed, and the circulation of brine in the loaded tanks is maintined with the top valves 42 open. The overflow of brine from the loaded tanks is returned to the brine header 40 by the overflow pipes 48a.

The tank unloading schedule as illustrated in FIG. 8 is as follows:

STAGE 1: Tanks Nos. 1 and 2 have thier bottom valves 44 closed. Tanks Nos. 3, 4 and 5 have their bottom valves 44 open to transfer brine into tank No. 1.

STAGE 2: Tank No. 1 has its bottom valve 44 open, with all other bottom valves closed. Tank No. 2 is filled with brine and the hatch cover 23 is also open, permitting the tuna to be unloaded by flotation. Excess brine overflow into tank No. 1. Tanks Nos. 3, 4 and 5 are dry of brine and loaded with frozen fish.

STAGE 3: Tanks Nos. 1, 3, 4 and 5 have their bottom valves 44 closed and the bottom valve 44 in No. 2 tank is open. Brine transferred from No. 2 tank into tank No. 3. Excess brine from No. 3 tank flows into No. 2 tank. Frozen fish in tank No. 3 are unloaded by flotation. Tanks Nos. 4 and 5 are dry of brine and loaded with frozen fish.

STAGE 4: Tanks Nos. 1, 2, 4 and 5 have their bottom vlaves 44 closed and the bottom valve in tank No. 3 open. Brine transferred from tank No. 3 to tank No. 4. Frozen fish in tank No. 4 are unloaded by flotation. Tank No. 5 is dry of brine and loaded with frozen fish.

The sequence is continued until all tanks are unloaded and the brine is returned to storage in tank No. 1. Alternatively, the used brine may be circulated through the brine collecting tanks 29 and 30 and made up to its original state by brine from the brine chillers 27, with the addition of sea water from the fire main 55. and calcium chloride crystals placed in the mixing basket 52.

The embodiments of the invention in which an exclusive property or privilege is claimed are defined as follows:

1. Apparatus for continous freezing of large fish on board a fishing vessel comprising a fishing vessel, said fishing vessel including a series of in line insulated fish freezing tanks, the said freezing tanks having hatch openings at deck level, and hermetically sealed hatch covers for said hatch openings, means for encapsulating in plastic bags the individual large fish brought on board the fishing vessel and vacuum sealing the bags, and means to feed the encapsulated fish through the hatch openings of the fish freezing tanks, refrigerating apparatus for feeding brine to the series of fish freezing tanks, the said refrigerating apparatus including feeding and return brine headers, pump means for circulating brine through the said header, individual valve controlled feed pipes between said feed brine header and each freezing tank, and individual valve controlled drains from each freezing tank to said return brine header, and brine collecting tanks in which the brine from the freezing tanks is replenished before being recirculated through the refrigerating apparatus.

2. Apparatus as set forth in claim 1 in which the said fish freezing tanks are in two rows, one to port and one to starboard, and each row being served by individual refrigerating apparatus and common brine feeding and return headers between said refrigerating apparatus and fish freezing tanks.

3. Apparatus as set forth in claim 2 in which the brine in the return header is fed to brine collecting tanks and is replenished with water and filtered before being returned to said refrigerating apparatus.

4. Apparatus as set forth in claim 2 in which each freezing tank is provided with a brine feeding pipe having a perforated portion located at the bottom of the tank, the said perforated portion having at least one relief valve.

5. Apparatus as set forth in claim 1 in which the said means to recycle the brine includes at least one brine collecting tank, a brine overflow from each freezing tank leading to the brine collecting tank, and means to feed fresh and sea water to said brine collecting tank.

6. Apparatus as set forth in claim 5 in which the said brine collecting tanks are each provided with a mixing basket into which the brine and fresh and/or salt water are directed before being returned to the refrigeration apparatus.

7. Apparatus as set forth in claim 1 in which the means to bag the fish and deliver the fish to the freezing tanks include a fish pound and conveyor means between the fish pound and the freezing tank hatch openings.

8. A continuous method for freezing large fish on board a fishing vessel which comprises precooling calcium chloride brine in the first tank of a series of separate, in-line freezing tanks, passing the precooled brine from said first tank to the second, next in line tank, lowering fish to be frozen into said second tank while progressively lowering the brine level so that the tank can be filled to the top without compressing the fish, hermetically sealing said second tank, circulating the brine from the bottom to the top and controlling the temperature of the brine within the second tank to freeze the fish in the tank, passing brine from said first tank to the third next in-line tank and repeating the sequence until the remaining tanks are fully loaded and the fish frozen.

9. A continuous method according to claim 8 wherein the specific gravity of the brine in the freezing tanks is maintained at approximately 1.2 as against the specific gravity of the fish (tuna) of 0.98, and the volume of brine in each tank is approximately 80% of the capactiy of the tank.

10. A continuous method according to claim 8 wherein the frozen fish are unloaded in the following sequence: unsealing said first tank and draining all tanks except said first tank of brine, returning said brine to said first tank to eject the frozen fish therein by flotation, passing the brine from said first tank to said second next in line tank to remove frozen fish therefrom by flotation and repeating the operation until the last tank in line is emptied of fish.

* * * * *